(12) United States Patent
Costello et al.

(10) Patent No.: US 7,924,148 B2
(45) Date of Patent: Apr. 12, 2011

(54) ROBUST RADIO FREQUENCY SIGNALS

(75) Inventors: John R. Costello, Rochester Hills, MI (US); Jean-Christophe Deniau, Fenton, MI (US); Brian Farrell, Troy, MI (US)

(73) Assignee: Continental Automotive Systems US, Inc, Auburn Hills, MI (US)

( * ) Notice: Subject to any disclaimer, the term of this patent is extended or adjusted under 35 U.S.C. 154(b) by 352 days.

(21) Appl. No.: 12/035,634

(22) Filed: Feb. 22, 2008

(65) Prior Publication Data

US 2008/0204217 A1 Aug. 28, 2008

Related U.S. Application Data

(60) Provisional application No. 60/903,266, filed on Feb. 23, 2007, provisional application No. 60/903,996, filed on Feb. 27, 2007, provisional application No. 60/906,697, filed on Mar. 13, 2007.

(51) Int. Cl.
*B60C 23/00* (2006.01)
*G08C 19/00* (2006.01)

(52) U.S. Cl. ............... 340/447; 340/539.1; 340/825.69; 340/825.72; 341/176

(58) Field of Classification Search .................. 340/447
See application file for complete search history.

(56) References Cited

U.S. PATENT DOCUMENTS

| | | | | | |
|---|---|---|---|---|---|
| 5,428,629 | A | * | 6/1995 | Gutman et al. | 714/758 |
| 5,463,374 | A | * | 10/1995 | Mendez et al. | 340/442 |
| 5,907,279 | A | * | 5/1999 | Bruins et al. | 340/506 |
| 6,810,501 | B1 | * | 10/2004 | Ferguson et al. | 714/781 |
| 7,511,608 | B2 | * | 3/2009 | Nornes | 340/445 |

FOREIGN PATENT DOCUMENTS

| | | |
|---|---|---|
| EP | 1013483 | 6/2000 |
| EP | 1356960 | 10/2003 |

OTHER PUBLICATIONS

International Search Report and Written Opinion dated Jun. 13, 2008.

* cited by examiner

*Primary Examiner* — Donnie L Crosland

(57) ABSTRACT

A tire pressure monitoring system includes a receiver for processing signals and alerting an operator of the vehicle should conditions within any of the tires fall outside a desired range. The transmitters within the tires emit shorter transmission signals during operation by eliminating transmission of the identification code. The receiver stores the identifier for each transmitter for comparison to subsequent transmissions. Subsequent transmissions do not include the identifier. The receiver combines the saved identifier with the value provided in the check portion of the incoming transmission. If the combination of the saved identifier with the value provided in the check portion meets a defined criteria, than the signal is recognized as originating from one of the transmitters.

15 Claims, 3 Drawing Sheets

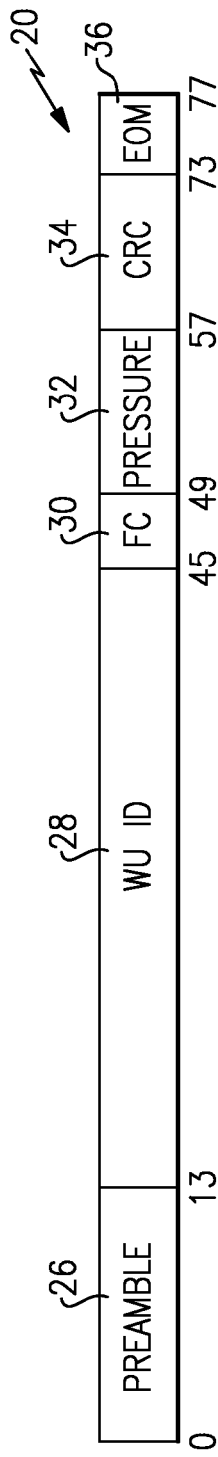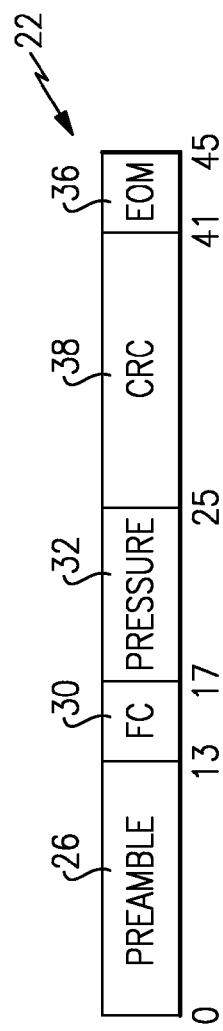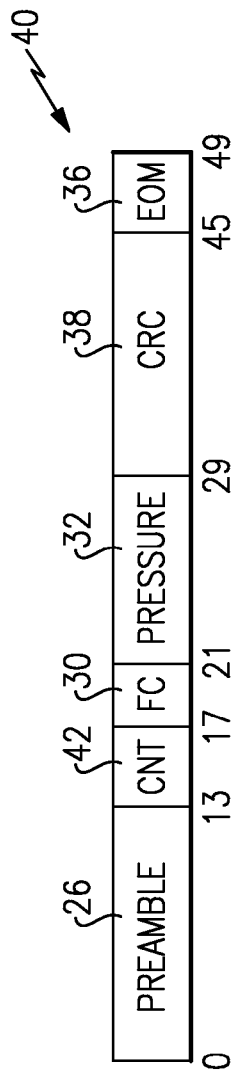

ROBUST RADIO FREQUENCY SIGNALS

CROSS REFERENCE TO RELATED APPLICATION

The application claims priority to U.S. Provisional Application Nos. 60/903,266 filed Feb. 23, 2007, 60/903,996 filed Feb. 27, 2007 and 60/906,697 filed Mar. 13, 2007.

BACKGROUND OF THE INVENTION

This invention generally relates to a method of reducing transmission length and increasing signal robustness. More particularly, this invention relates to a method of increasing signal robustness between multiple transmitters and a receiver within a motor vehicle.

A tire pressure monitoring system utilizes radio frequency signals from multiple transmitters positioned in a vehicles tires. The characteristics of the radio frequency signals are subject to local regulations and therefore the length and strength of each signal can be limited. Further, longer signals are more susceptible to outside interference that can disrupt the transmission of the desired data.

Accordingly, it is desirable to design and develop methods to increase transmission signal reliability and overall robustness to provide accurate and reliable communication of data indicative of current tire conditions.

SUMMARY OF THE INVENTION

An example tire pressure monitoring system includes a receiver processing signals and alerting an operator of the vehicle should conditions within any of the tires fall outside a desired range. The example method provides for shorter transmission signals during operation by eliminating transmission of the identification code. The receiver stores the identifier for each transmitter for comparison to subsequent transmissions.

Subsequent transmissions do not include the identifier. The transmission includes the check portion that provides a check of the transmission that is read and acted on by the receiver. The receiver combines the first saved identifier with the value provided in the check portion of the incoming transmission. If the combination of the first saved identifier with the value provided in the check portion meets a defined criteria, than the signal is recognized as originating from a first one of the transmitters. If the combination with the first saved identifier does not meet the defined criteria, a second one of the saved identifiers is combined with the value, and so on until the defined criteria is met, or the signal is determined to have originated from an unrecognized transmitter.

Another example transmission without an identifier includes a count portion that is incremented for each transmission. Therefore, the check portion is also incremented and the count is transmitted to the receiver. The receiver matches the identifier with the transmission and the count. If the incremented count includes a value that is expected for a specific one of the identifiers, then the transmission is accepted as originating from a known transmitter. However, if the count is not of an expected value, then the receiver determines that that the signal is incorrect and disregards that signal.

Another example transmission is verified by comparing an identifier with the pressure data portion. The example process eliminates the possibility of incorrectly validating an incorrect transmission by generating the checksum in a byte-wise exclusive OR on the identifier and the pressure only. If a flipped bite is contained in the pressure data, then the only way for the checksum to validated the incorrect data if for similarly positioned bite in the identifier to also be flipped. However, if any identifier bite is flipped, then the transmission will not be recognized by the receiver and the transmission will be disregarded.

Accordingly, the example transmissions and processes increase reliability and veracity of data transmissions between the transmitters and the receiver of a tire pressure monitoring system.

These and other features of the present invention can be best understood from the following specification and drawings, the following of which is a brief description.

BRIEF DESCRIPTION OF THE DRAWINGS

FIG. 2 is a schematic view of an example initial signal including an identifier.

FIG. 3 is a schematic view of an example signal without an identifier.

FIG. 4 is a schematic view of another example signal without an identifier that includes incremented count data.

DETAILED DESCRIPTION OF THE PREFERRED EMBODIMENT

Figure 1:
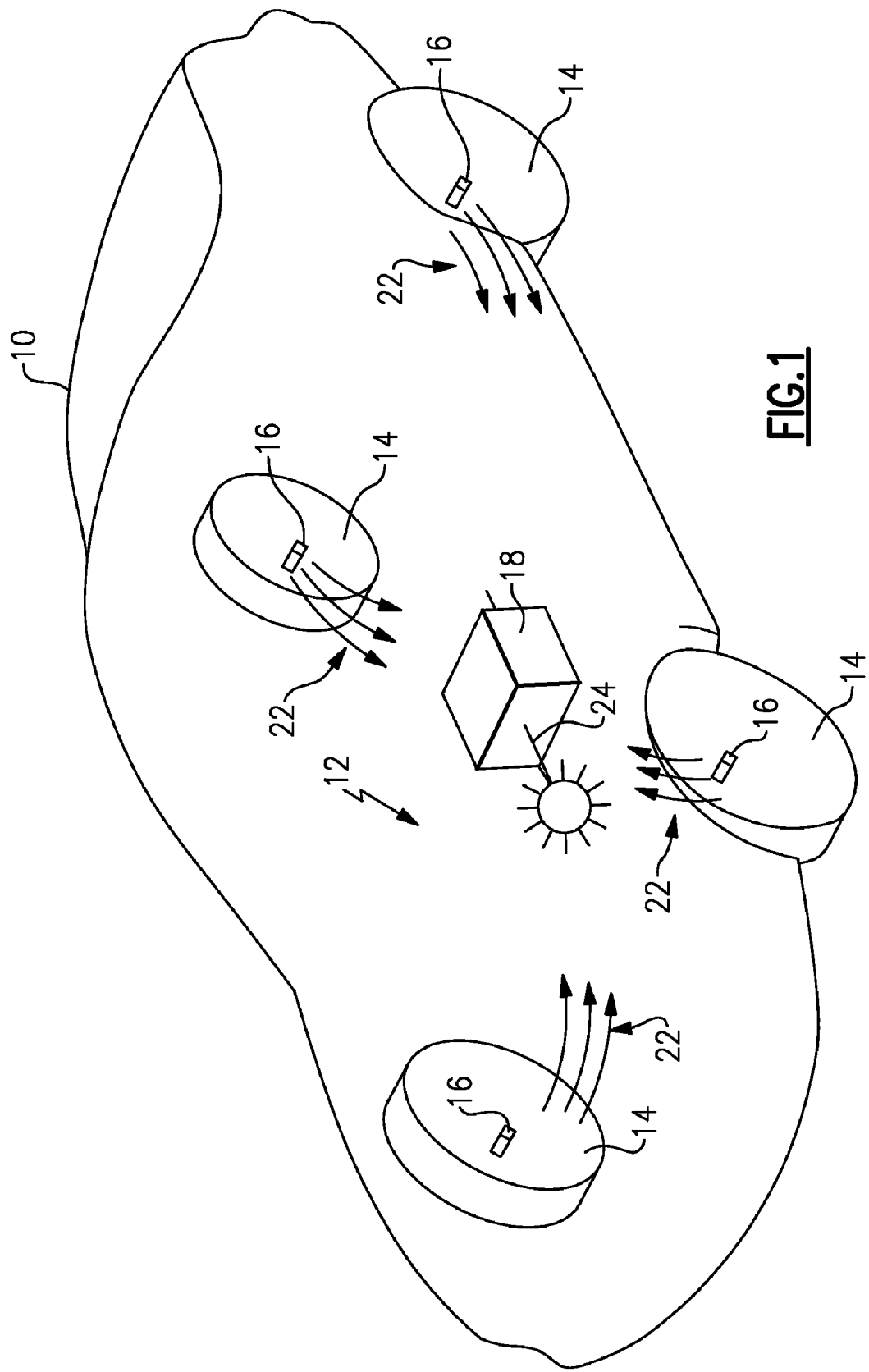
FIG. 1 is a schematic view of a vehicle including an example tire pressure monitoring system.

Referring to FIG. 1, a vehicle 10 includes a tire pressure monitoring system 12 for providing information on conditions within tires 14. Each tire 14 includes a tire pressure monitoring sensor 16 that measures conditions within the tire 14 and emits a signal 22 to a receiver 18. The receiver 18 processes the signals 22 and alerts an operator of the vehicle should conditions within any of the tires 14 fall outside a desired range.

The receiver 18 includes an antenna 24 for receiving the signals 22 from the transmitters 16. The signals 22 are radio frequency signals and are therefore the length, power, and other characteristics of the signal are regulated. Further, the length and power of each of the signals 22 is directly related to the reliability of signal receipt by the receiver 18. Shorter signals are less susceptible to potential interference. Further, a shorter signal 22 requires less power, or can be of increased strength using the same power. Accordingly, there are many advantages to reducing the overall length of the signals 22.

The example method provides for shorter transmission signals 22 during operation by eliminating transmission of the identification code. Referring to FIG. 1, an initial transmission 20 is sent from each of the transmitters 16 responsive to a learn prompt. The learn prompt can be a low frequency prompt transmission from a separate device, or can be a designated signal from the receiver 18. In any case, the learn prompt, prompts transmission of the initial signal 20. The example initial signal 20 includes a preamble 26, an identifier 28, a function code (FC) 30, pressure data 32, a check portion 34 and an end of message portion 36. The identifier 28 includes an alphanumeric code that is unique to the transmitter that originated the message.

Upon receipt of the initial transmission 20, the receiver 18 stores the identifier 28 for comparison to subsequent transmissions. However, once the identifier 28 is known and stored by the receiver 18 it is not transmitted during normal operation. Instead, the identifier 28 is omitted.

Referring to FIG. 3, the transmission 22 includes all the portions of the initial signal 20 except for the identification code 28. The transmission 22 includes the check portion 34 that provides a check of the transmission 22 that is read and acted on by the receiver. Typically, the check portion 34 provides a count or some value that is indicative of the entire transmission 22. That value is utilized to error proof the transmission 22. Removal of the identification code 28 shortens the transmission 22 and the check portion 38 reflects the shorter transmission with a value that reflects the removal of the identifier 28. The transmission 22 is then received by the receiver 18.

Upon receipt of the transmission 22 by the receiver 18, the first saved identifier is combined with the value provided in the check portion 38. If the combination of the first saved identifier with the value provided in the check portion 38 meets a defined criteria, then the signal is recognized as originating from a first one of the transmitters 16. If the combination with the first saved identifier does not meet the defined criteria, a second one of the saved identifiers is combined with the value, and so on until the defined criteria is met, or the signal is determined to have originated from an unrecognized transmitter.

In the example transmission, the check portion comprises a cyclic redundancy check (CRC) of either 8 or 16 bits. As appreciated, other variations of the cyclic redundancy check are also within the contemplation of this invention. In the example, the CRC is calculated as is known, and the remainder is added to the normal transmission. The receiver 18 includes an algorithm that corresponds with the calculated CRC. The receiver 18 adds the first saved identifier to the received data and performs an operation on the combination of the first saved identifier and the received data. If this combination meets the defined and expected criteria according to the specific algorithm, that transmission is determined to have been transmitted from the first transmitter. Further, operations are only commenced if the first combination according to the algorithm does not meet the desired criteria. Accordingly, the transmissions 22 become shorter, providing all the desired advantages while maintaining the verification function.

Referring to FIG. 4, another example transmission 40 without an identifier 28 includes a count portion 42. In some instances, because the identifier 28 is not sent with the transmission 22, there is a remote chance that an incorrect identifier could be associated with a transmission 22. This would occur if an error or some other data corruption occurs in the FC 30 and the pressure value 32, or if another identifier meets the same criteria. In such an event, the check portion 38 may combine with the stored identifiers in such a way as to meet the desired criteria according to the specific algorithm, but for the wrong transmitter 16.

The example transmission 40 includes the count portion 42 that is incremented for each transmission. Therefore, the check portion 38 is also incremented and the count is transmitted to the receiver 18. The receiver 18 matches the identifier 28 with the transmission 40 and the count. If the incremented count includes a value that is expected for a specific one of the identifiers 28, then the transmission is accepted as originating from the transmitter 16 corresponding to the saved identifier. However, if the count is not of an expected value, then the receiver 18 determines that that the signal is incorrect and disregards that signal.

In the example, the count portion 42 comprises a 4 bit counter that increments in response to each transmission. The count for each identifier stored in the receiver 18 is stored and compared to subsequently received transmission. A separate count is stored for each identifier 28. If the received count data for any transmission does not correspond with the expected value for each identifier 28 than that transmission is disregarded. Accordingly, the count portion provides an additional verification of the origin of any received transmission.

Figure 5:
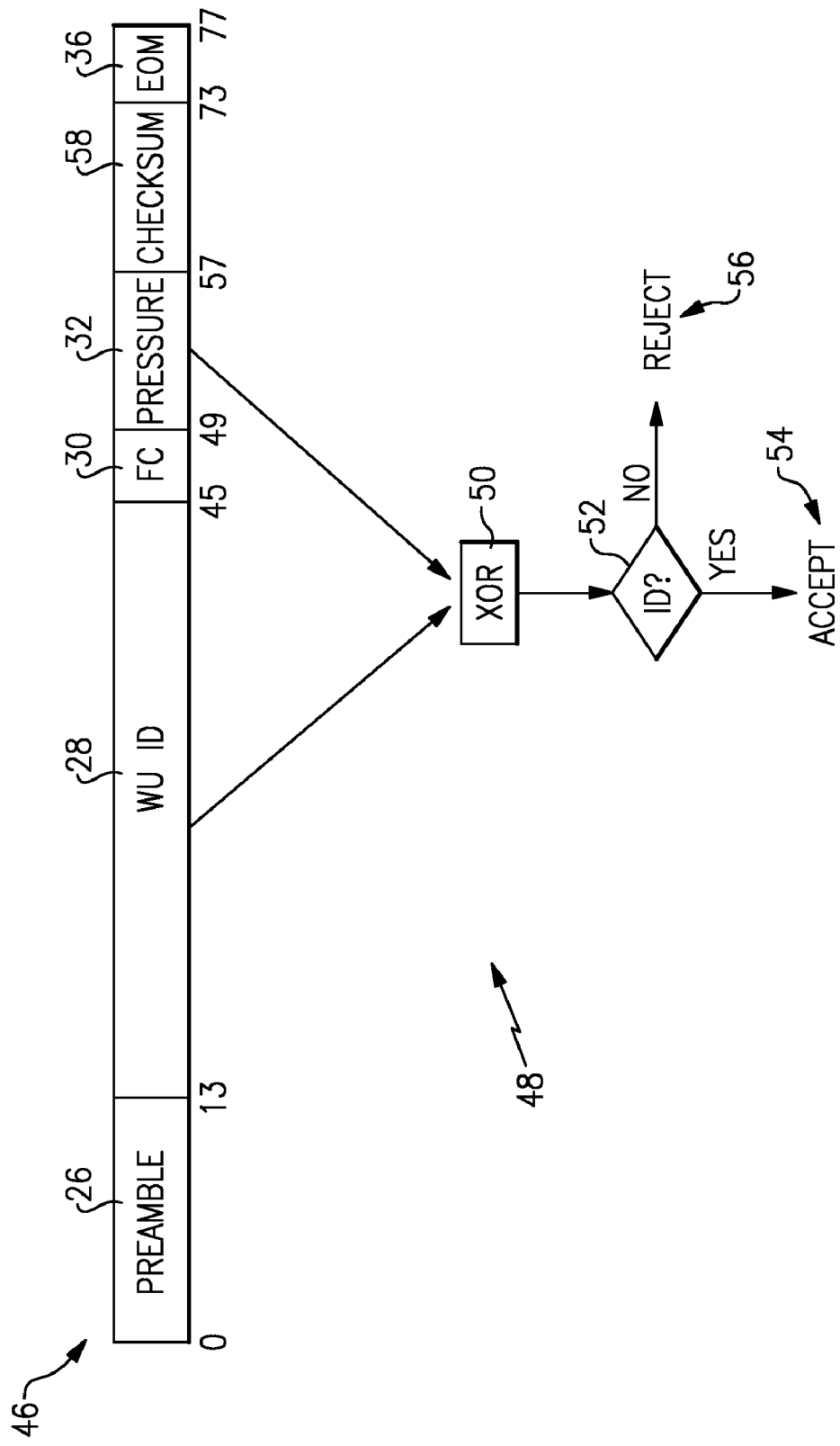
FIG. 5 is schematic view of an example method of verifying a data signal.

Referring to FIG. 5, another transmission 46 is verified by comparing an identifier 28 with the pressure data portion 32. The example transmission 46 includes a checksum 58 for checking the validity of a transmission. The checksum 58 is generated by a specific algorithm utilizing portions of the transmission 46. For example, the checksum 58 may be generated by performing a byte-wise sum or an exclusive Or (XOR) on all the data bytes including the identifier 28, the pressure 32, and any other data sent within the transmission 46.

However, in some instances, non-critical bytes that do not effect whether or not an alert is provided to the driver can cause errant data to be incorrectly validated. Such instances can occur when utilizing an XOR of all the data bytes. If one bit is flipped in the pressure data 32 and another in the same position for another portion of the transmission is also flipped, the checksum 58 could indicate incorrectly that the data transmission is valid.

The example process 48 eliminates the possibility of incorrectly validating an incorrect transmission by generating the checksum in a byte-wise exclusive OR on the identifier 28 and the pressure 32 only as indicated at 50. These portions of the transmission 46 include the data required to be valid in order to correctly alert an operator of an out of range condition. Because the XOR process is generated using only the pressure 32 and the identifier 28, no flipped bytes can be undesirably validated. If a flipped byte is contained in the pressure data 32, then the only way for the checksum 58 to validated the incorrect data if for similarly positioned byte in the identifier 28 to also be flipped. However, as is indicated at 52, if an identifier byte is flipped, then the transmission will not be recognized as indicated at 56, by the receiver 18, as the identifier will not match any of the previously saved identifiers. The transmission will simply be disregarded and no errant data will be received and processed. If the identifier 28 and the checksum 58 both are valid, the transmission 46 will be accepted as indicated at 54 and further processed to alert a vehicle operator, if required.

Accordingly, the example transmissions and processes increase reliability and veracity of data transmissions between the transmitters and the receiver of a tire pressure monitoring system.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of communicating radio frequency signals between a transmitter and a receiver comprising the steps of:
   a) learning an identification code corresponding to a transmitter by storing the identification code in a receiver;
   b) transmitting a signal with the transmitter that includes a checksum value determined without the identification code;
   c) receiving the signal with the receiver and combining data from the learned identification code stored within the receiver with the received checksum value; and
   d) verifying that the signal is from an approved transmitter with the receiver responsive to the combination of the learned identification code and the checksum value resulting in an expected value.

2. The method as recited in claim 1, wherein the receiver learns and stores a plurality of learned values from a corresponding plurality of transmitters, and the step of combining data from the learned identification code to the checksum value further comprises combining a first one of the plurality of learned values with the received signal.

3. The method as recited in claim 2, including the step of combining a second one of the plurality of learned values to the received checksum value responsive to the combination of the first one of the plurality of learned values failing to result in an expected value.

4. The method as recited in claim 1, wherein the checksum value comprises a cyclic redundancy check.

5. The method as recited in claim 4, wherein the cyclic redundancy check comprises on of eight and 16 bits.

6. The method as recited in claim 1, wherein the transmission includes a count value that increments with each transmission.

7. The method as recited in claim 6, wherein the count value is utilized in determining the checksum value.

8. The method as recited in claim 6, wherein the count value is stored in the receiver for each of a plurality of transmitters.

9. The method as recited in claim 1, wherein the transmission includes a data portion, a preamble portion, a checksum portion and an end of message portion.

10. A method of verifying the veracity of a radio frequency signal transmitting data from a transmitter to a receiver, the method comprising the steps of:

a) transmitting a data signal with a transmitter including data indicative of measured parameter and an identification code corresponding to the transmitter;
b) generating a checksum value by the transmitter by performing a byte-wise exclusive OR on a portion of the transmission data signal less than the entire data signal including at least the identification code and the measured parameter bytes; and
c) determining that the veracity of the transmission is true responsive to the identification code and the checksum both being validated by a receiver.

11. The method as recited in claim 10, wherein the measured parameter comprises data indicative of a pressure within a tire.

12. The method as recited in claim 10, including the step of storing an identification code for the transmitter within the receiver.

13. The method as recited in claim 10, wherein the identification code is not verified responsive to the measured parameter including an incorrect data byte.

14. The method as recited in claim 13, wherein a bit-flip between the measured parameter and the identification code results in an acceptable checksum value and an incorrect identification code.

15. The method as recited in claim 10, wherein the measured value comprises any value measured that is indicative of conditions within a tire.

* * * * *